United States Patent [19]

Caines

[11] 4,199,628
[45] Apr. 22, 1980

[54] VERMICULAR EXPANDED GRAPHITE COMPOSITE MATERIAL

[75] Inventor: Ronald S. Caines, Midland, Mich.

[73] Assignee: The Dow Chemical Company, Midland, Mich.

[21] Appl. No.: 889,308

[22] Filed: Mar. 23, 1978

[51] Int. Cl.$^2$ .................... C01B 31/04; B32B 31/20; B32B 27/00

[52] U.S. Cl. .................... 428/36; 138/137; 138/143; 138/146; 252/378 R; 264/29.1; 264/113; 423/448; 423/460; 427/181; 427/230; 428/144; 428/310; 428/408; 428/422; 428/457

[58] Field of Search .................. 264/29.1, 105, 113, 264/115; 252/511, 378 R; 423/448, 460; 156/327; 427/180, 181, 230, 239; 428/36, 408, 422, 457, 310, 144; 138/137–139, 141, 143, 145, 146, DIG. 3

[56] References Cited

U.S. PATENT DOCUMENTS

| | | | |
|---|---|---|---|
| 2,685,707 | 8/1954 | Llewellyn et al. | 264/174 |
| 2,724,672 | 11/1955 | Rubin | 156/287 |
| 2,752,637 | 7/1956 | Walker et al. | 264/119 |
| 2,907,103 | 10/1959 | Lewis et al. | 29/421 |
| 2,972,780 | 2/1961 | Boonstra | 264/26 |
| 2,991,808 | 7/1961 | Siegmann et al. | 138/141 |
| 3,050,786 | 8/1962 | St. John et al. | 264/573 |
| 3,239,931 | 3/1966 | Guarnaschelli | 29/520 |
| 3,265,124 | 8/1966 | Reys | 165/133 |
| 3,323,869 | 6/1967 | Olstowski | 23/209.1 |
| 3,389,073 | 6/1968 | Olstowski et al. | 264/105 X |
| 3,389,200 | 6/1968 | Olstowski et al. | 264/105 |
| 3,389,964 | 6/1968 | Olstowski | 23/209.1 |
| 3,404,061 | 10/1968 | Shane et al. | 428/143 |
| 3,440,311 | 4/1969 | Olstowski et al. | 264/115 |
| 3,475,244 | 10/1969 | Sanders | 156/83 |
| 3,492,197 | 1/1970 | Olstowski et al. | 428/408 |
| 3,956,568 | 5/1976 | Kanemaru et al. | 428/457 X |
| 3,967,029 | 6/1976 | Veltri et al. | 428/408 X |
| 3,980,105 | 9/1976 | Myskowski | 138/140 |
| 3,994,692 | 11/1976 | Rudy | 428/457 X |
| 4,075,114 | 2/1978 | Ishikawa et al. | 428/408 X |

FOREIGN PATENT DOCUMENTS 1257010 12/1971 United Kingdom.

*Primary Examiner*—Harold Ansher
*Attorney, Agent, or Firm*—James M. Kuszaj; Charles J. Enright

[57] ABSTRACT

The present invention relates to a vermicular expanded graphite composite material and to an improved method for preparing such material by blending vermicular expanded graphite with a corrosion resistant resin dispersed in a carrier, vaporizing the carrier, and heating the composite material to sinter the resin. Compressed forms of the composite material are useful for protecting corrosion vulnerable substrates.

14 Claims, No Drawings

VERMICULAR EXPANDED GRAPHITE COMPOSITE MATERIAL

BACKGROUND OF THE INVENTION

Vermicular expanded graphite is a low bulk density, (usually between 0.002 and 0.02 gram per cubic centimeter), particulate, worm-like form of graphite. It is prepared by treating natural flake graphite with an intercalating agent such as fuming nitric acid, fuming sulfuric acid, mixtures of concentrated nitric and sulfuric acid, and the like. The treated graphite is then heated to a high temperature, e.g., above 500° C., to expand the natural flake graphite to the light weight vermicular form. The preparation of the vermicular expanded graphite is well known in the art, and is described in greater detail, for example, in U.S. Pat. Nos. 3,389,964 and 3,323,869, which are incorporated herein by reference.

Vermicular expanded graphite is often compressed into various shapes and forms or onto various substrates or supports. The resulting compressed graphite structure has many desirable properties including, for example, high electrical and thermal conductivity, high anisotropic ratios, resistance to high temperature oxidation, and excellent mechanical properties. Because of these properties, compressed forms of vermicular expanded graphite have found utility as coatings for various metal substrates, for example, as described in U.S. Pat. No. 3,492,197.

A disadvantage to the use of compressed forms of vermicular expanded graphite as substrate coatings is that such graphite is subject to permeation by corrosive fluids upon prolonged contact.

To render natural flake graphite impermeable to corrosive fluids, it has been suggested to impregnate such graphite with a polymeric substance, such as, for example, an aqueous polytetrafluoroethylene dispersion. (See, for example, British Pat. No. 1,257,010.) However, low fluid permeability is not obtained by such impregnation even after repeated treatment due to the high water content of the dispersion.

Vermicular expanded forms of graphite have also been impregnated with certain polymeric substances. For example, U.S. Pat. No. 3,492,197 describes the blending of finely powdered inorganic or organic resins, such as polytetrafluoroethylene, with vermicular expanded graphite to improve the thermal, electrical, and mechanical properties of the expanded graphite. However, such treatment has not been found to impart to the graphite the desired impermeability to corrosive fluids, since powdered resins tend to agglomerate in localized areas of the graphite leaving other areas of the graphites open to fluid permeation.

U.S. Pat. No. 3,492,197 also describes the blending of a solution of inorganic or organic resins dissolved in a solvent with vermicular expanded graphite. However, such treatment is not desirable because many corrosion resistant resins, such as polytetrafluoroethylene, are insoluble in any solvent. Moreover, the use of a solvent can cause particularly poor compression characteristics in expanded graphite due to the tendency of vermicular expanded graphite to retain a high residual solvent content.

A need therefore exists for an improved method of forming vermicular expanded graphite material which is impermeable to fluids, especially corrosive fluids at high temperatures.

SUMMARY OF THE INVENTION

The present invention is an improvement in a process for preparing compressed forms of vermicular expanded graphite. The process includes the steps of (a) providing a supply of vermicular expanded graphite; (b) providing a supply of corrosion resistant resin; (c) blending said vermicular expanded graphite and corrosion resistant resin in an amount of from about 3 to about 50 weight percent resin based on the total weight of the expanded graphite-resin mixture; (d) compressing said mixture at a pressure within the range of from about 5 to about 50,000 pounds per square inch in predetermined directions into predetermined forms of graphite. The improvement comprises (1) blending the vermicular expanded graphite with the corrosion resistant resin in the form of a dispersion of the resin in a volatile liquid carrier; (2) vaporizing the liquid carrier; and (3) heating the composite material to a sufficient temperature to sinter the resin prior to compression.

The resulting vermicular expanded graphite composite material contains from about 50 to 97 percent by weight of vermicular expanded graphite and from about 3 to about 50 percent by weight of the corrosion-resistant resin. The corrosion-resistant resin has a particle size of from about 0.05 to about 0.5 microns and is uniformly distributed in the pores formed between adjacent graphite particles.

When a dispersion of a corrosion-resistant resin is blended with vermicular expanded graphite in accordance with the improved process, the resulting compressed vermicular expanded graphite composite material possesses unexpectedly enhanced properties compared to conventionally produced forms of compressed vermicular expanded graphite composite material. These enhanced properties include: lower permeability to concentrated hydrochloric acid and other corrosive fluids, greater resistance to high temperature oxidation, and greater resistance to the formation of scale deposits. These characteristics make the compressed vermicular expanded graphite composite material useful for coating corrosion-vulnerable substrates.

DETAILED DESCRIPTION OF THE INVENTION

Compressed forms of vermicular expanded graphite-resin material are conventionally produced by blending a supply of the vermicular expanded graphite with an inorganic or organic resin in amounts of about 3 to about 50 weight percent resin based on the total weight of the vermicular expanded graphite-resin mixture. This mixture is then compressed at a pressure within the range of from 5 to about 50,000 pounds per square inch in predetermined directions into predetermined forms of graphite. The so-formed composite material is then treated to activate the resin, thus promoting adhesion within the mixture. A detailed description of the conventional features of this process can be found in U.S. Pat. No. 3,492,197, which is incorporated herein by reference.

The improved process comprises blending the vermicular expanded graphite with a sufficient amount of a corrosion resistant resin in the form of a dispersion of the resin in a volatile liquid carrier, to render the vermicular expanded graphite material substantially impervious to fluids. Generally, the vermicular expanded graphite is blended with the corrosion resistant resin in an amount of from about 3 to about 50 weight percent resin, based on the total weight of the vermicular expanded graphite-resin mixture. In other embodiments, the vermicular expanded graphite is blended with from about 5 to about 25 weight percent resin, and more preferably from about 10 to about 15 weight percent resin.

Resins which are suitable for use in the instant invention are thermoplastic polymers which are substantially inert or chemically resistant to degradation when exposed to the corrosive action of fluids such as, for example, hydrochloric acid, other strong acids, and caustic solutions. Illustrative examples of such resins include, but are not limited to, the following: polytetrafluoroethylene, polytrifluorochloroethylene, fluorinated ethylene propylene copolymers, perfluoroalkoxy resins, polyethylene, acrylic and methacrylic polymers, polystyrene, epoxy resins, polyvinyl chloride, polyesters, polycarbonates resins, phenol formaldehydes, nylon, polyvinylidenefluoride, copolymers of the same, and the like. The preferred resins are solid thermoplastic polymers resistant to degradation by corrosive chemical fluids at temperature of at least about 300° F. Illustrative examples of such preferred corrosion-resistant resins include: polytetrafluoroethylene, polytrifluorchloroethylene, fluorinated ethylene propylene, perfluoroalkoxy resins, mixtures thereof, and the like. The most preferred corrosion-resistant resin is polytetrafluoroethylene.

Liquid carriers which are used in the instant invention are those which are readily volatilized at relatively low temperatures and which are compatible with both the resin and the vermicular expanded graphite. Illustrative examples of such carriers include, for example: water, xylene, kerosene, acetone, and the like. Water has been found to be a suitable liquid carrier for the resin in most instances, and is preferred because of its low cost and ease of volatilization.

The amount of corrosion-resistant resin dispersed within the volatile liquid carrier is not critical. A dispersion containing from about 1 to about 5 percent by weight of particulate corrosion-resistant resin has been found to be satisfactory, and is preferred. The resin particles dispersed in the carrier have an average particle size of from about 0.05 to about 0.5 micron. Larger particle sizes may be employed if desired. However, small particle sizes are preferred because they are most effective in achieving a uniform dispersion of the resin in the final composite material.

The dispersion of the corrosion-resistant resin can be blended with the vermicular expanded graphite by spraying the dispersion on the vermicular expanded graphite while the vermicular expanded graphite material is being gently agitated. Other methods of contacting the resin and graphite which minimize the attrition of the graphite particles and insure uniform distribution of the resin throughout the graphite can also be used if desired.

Following blending of the vermicular expanded graphite with the corrosion-resistant resin, the liquid carrier is volatilized by heating the vermicular expanded graphite corrosion-resistant resin composite material to a sufficient temperature and for a sufficient time to vaporize substantially all of the liquid carrier. For example, when water is the liquid carrier, the composite material is heated at a temperature of at least about 110° C. for about 4 hours. It has been found that substantially all of the volatile liquid carrier must be removed to insure adequate compressability of the composite material. If residual volatile liquid carrier becomes entrapped within the expanded graphite particles, the graphite material will reexpand following initial compression. This reexpansion is highly undesirable in many applications.

After the liquid carrier has been vaporized, the composite material is again heated to a sufficient temperature to sinter the resin. Sintering is defined in this context as the coalescing of the resin particles at temperatures below the melting point of the resin. A sintering temperature of from about 680° F. to about 700° F. is commonly used to sinter a corrosion resistant resin such as polytetrafluoroethylene. Sintering temperatures for other corrosion resistant resins are well known in the art.

The vermicular expanded graphite composite material produced by the present improved process contains from about 50 to about 97 percent by weight vermicular expanded graphite, and from about 3 to about 50 percent by weight of a corrosion resistant resin. The resin has an average particle size of from about 0.05 to about 0.5 microns, and is uniformly distributed in the pores formed between adjacent graphite particles.

The vermicular expanded graphite composite material can be used as a chemically inert, liquid impermeable, material for coating corrosion-vulnerable substrates. Such substrates are generally constructed of metals such as aluminum, magnesium, copper, molybdenum, iron, nickel, silver, titanium, or of ceramic material. The substrates may have any shape. However, the vermicular expanded graphite composite material is especially advantageous for coating the interior portion of substrates having a generally tubular cross-section such as a pipe and other conduit.

One manner of internally lining a substrate, such as a conduit, with the vermicular expanded graphite composite material of the present invention involves positioning within the interior of the conduit a pressure actuated resiliently expandable element, such as a rubber tube. The rubber tube has approximately the same longitudinal dimensions and substantially the same peripheral contour as the interior surface of the conduit, but has its initial outside diameter smaller than the inside of the conduit. Thus, the rubber tubing can be concentrically located within the interior of a conduit to be lined.

After the rubber tubing is positioned within the conduit, the vermicular expanded graphite composite material is introduced into the annular space formed between the internal surface of the conduit, and the outer surface of the rubber tubing. The size of the annular space varies with the inside diameter of the conduit. For example, when a 2 inch inside diameter conduit is employed, the annular space is generally from about ⅛ inch to about ¾ inch in diameter.

The vermicular expanded composite material is prepared as described above. Before introduction of the vermicular expanded graphite composite material into the annular space, the material is preferably subjected to sufficient impacting force to at least partially agglomerate the individual vermicular expanded graphite composite particles. In one embodiment, the impacting force is supplied by mixing the vermicular expanded graphite composite material in a blender for about 20 to 30 seconds. Vermicular expanded graphite composite material so treated has been found to exhibit superior compacting properties.

When the annular space is filled with the loose vermicular expanded graphite composite material, sufficient pressure is applied to the interior of the rubber tubing to compress the vermicular expanded graphite composite material against the interior surface of the conduit. The pressure is applied by introducing a pressurized fluid, such as water or a gas, into the interior of the rubbing tubing. The pressure applied to the composite material by the compression is generally from about 100 to about 1,000 pounds per square inch (psi) and preferably from about 100 to about 500 (psi). As a result of this compression, a layer of the vermicular expanded graphite composite material is deposited on the interior surface of the conduit. The thickness of this layer depends upon the density of vermicular expanded graphite composite material introduced into the annular space, the diameter of the conduit, the amount of pressure applied against said vermicular expanded graphite composite material, and the ultimate end use of the liquid conduit.

The first stage compression process described above may be repeated and additional amounts of vermicular expanded graphite composite material introduced into the conduit and compressed until a final coating of predetermined thickness has been achieved. Generally, the final coating thickness will depend upon the inside diameter of the conduit. For example, when a 2 inch inside diameter conduit is employed, the coating thickness is from about 0.10 to about 0.20 inch.

When the desired coating thickness has been achieved, the rubber tubing is removed from the interior of the conduit and replaced with a rubber bag which fits around the exterior of the conduit and seals the surface of the deposited vermicular expanded graphite composite material from the environment. The entire conduit is then isostatically compressed by applying sufficient force in all directions to form a substantially smooth lining of the vermicular expanded graphite composite material on the interior surface of the conduit.

The desired thickness of the isostatically compressed lining depends upon the ultimate end use and upon the diameter of the conduit. For example, when a 2 inch inside diameter metal conduit is to be employed to carry a highly corrosive fluid, such as hydrochloric acid, a isostatically compressed lining having a thickness of from about 0.05 to about 0.10 inch has been found to be satisfactory.

The isostatical compression is generally done in a conventional apparatus at a pressure of from about 5,000 to about 100,000 psi. Pressures of from about 15,000 to about 30,000 psi are preferred. Pressures in excess of 100,000 psi may be used if desired. However, pressures in excess of 100,000 psi do not markedly improve the fluid impermeability of the composite material, and are therefore, not generally employed.

When the conduit to be lined has a flanged end portion, the method of lining the interior with the vermicular expanded graphite composite material can be modified slightly. The modification involves providing a supply of vermicular expanded graphite composite material and precompressing the expanded vermicular graphite composite material into a structure which conforms to the interior surface of the flanged portion of the conduit. This preformed structure has a longitudinally extending portion which corresponds to the barrel of the conduit but which extends in concentric alignment into only a portion of the barrel. These precompressed structures are positioned within the interior of the conduit at each flanged end portion. The barrel portion of the conduit is lined with the expanded vermicular graphite substantially as described above.

The advantages and practice of the present invention are further illustrated by the following examples.

EXAMPLE I

Preparation of Compressed Vermicular Expanded Graphite Composite Material

PART A

A commercially available natural flake graphite (Cummings-Moore #3061) having a flake size range of from about 10 mesh (U.S. Standard Series) to about 50 mesh was wetted with an acidic mixture of about 85 percent by weight concentrated sulfuric acid ($H_2SO_4$) and about 15 percent by weight concentrated nitric acid ($HNO_3$). The graphite was then washed free of excess acid. The so-called acidified graphite flakes were heated with a propane torch to about 1000° C. thereby producing a loose particulate worm-like product having an apparent bulk density of from about 0.1 to about 0.5 pounds per cubic foot.

A 6 gram (g) sample of a commercially available aqueous dispersion of polytetrafluoroethylene resin particles 0.05 to 0.5 micron in size was employed as the corrosion resistant resin. (TEFLON ® 30 TFE Fluorocarbon resin, manufactured by E. I. duPont de Nemours & Company, Inc.). The dispersion contained from about 59 to 61 percent by weight solids. The dispersion was diluted with approximately 750 milliliters (ml) of water, and placed in the aluminum cup of a spray gun (DeVilbiss Co., Type CGA, Series 502) operated at about one pound pressure.

A 120 g sample of the vermicular expanded graphite was weighed out and placed in a round, 20 gallon drum. The drum was rotated at about 30 revolutions per minute (rpm) while the polytetrafluoroethylene resin dispersion was sprayed at a rate of about 100 ml/minute on the expanded graphite. After application of the dispersion, the vermicular expanded treated graphite material was removed from the drum and heated to about 120° C. to remove the water. The dried material was then heated from about 360° C. to about 372° C. for about four hours to sinter the deposited resin. The dried product was removed and analyzed. The product was a vermicular expanded graphite composite material containing about 3 percent by weight of polytetrafluoroethylene resin particles.

A 20 g (gram) sample of the vermicular expanded graphite composite material was introduced into a cylindrical mold of 3 inch inside diameter. The composite material was compressed to about 5,600 pounds per square inch to obtain a flat disk measuring 3 inches in diameter and about 0.1 inch thick.

PARTS (B)-(E)

In a manner substantially as described in Part A, compressed vermicular expanded graphite composite material containing the following percentage by weight of polytetrafluoroethylene resin were prepared:
(B) 5 percent by weight polytetrafluoroethylene
(C) 12 percent by weight of polytetrafluoroethylene
(D) 20 percent by weight polytetrafluoroethylene
(E) 50 percent by weight polytetrafluoroethylene.

EXAMPLE II

First Stage Permeability Testing of Vermicular Expanded Graphite Composite Material A compressed vermicular expanded graphite composite material prepared as described in Example I-A was tested for fluid impermeability by the following procedure: The compressed disk described in Example I-A was placed on top of a piece of aluminum foil which was in contact with a 0.25 inch thick aluminum plate. A 3 inch long glass tube having a 2 inch inside diameter was placed over the compressed disk. A one-holed rubber stopper was placed in the top end of the glass tube, a stainless steel bracket was then used to bolt the glass tube to the aluminum plate, thus sealing the compressed disk. The glass tube was filled with a concentrated hydrochloric acid solution and the hole in the stopper was plugged shut. The concentrated hydrochloric acid solution was allowed to remain in contact with the composite disk for 2½ months. The glass tubing was then dismantled and the aluminum foil was examined for corrosion. The aluminum foil was completely intact with no evidence of any permeation by the acid through the composite disk.

EXAMPLE III

Comparison of Forms of Corrosion Resistant Resin Employed

The following procedure was carried out to compare the properties of compressed vermicular expanded graphite composite structures prepared from contacting vermicular expanded graphite with a dispersion of polytetrafluoroethylene resin particles 0.05 to 0.5 micron in size in accordance with the instant invention as compared to compressed vermicular expanded graphite compacts prepared by contacting vermicular expanded graphite with powdered polytetrafluoroethylene resin particles having a particle size of about 149 microns.

PART (A)

A compressed vermicular expanded graphite composite material containing about 12 percent by weight polytetrafluoroethylene was prepared substantially as described in Example I-A. The material was analyzed by an electron probe to determine the distribution of the polytetrafluoroethylene resin in the longitudinal and transverse sections. The electron probe characterized the polytetrafluoroethylene resin distribution by X-ray mapping of the fluorine atom content with a special resolution of approximately 3 millimicrons.

PART (B)

Similarly, a vermicular compressed graphite composite material containing about 12 percent by weight of the 149 micron polytetrafluoroethylene powder mechanically mixed with the vermicular expanded graphite was prepared and compressed as described in Example I-A (Comparative Run X). This material was also analyzed by the electron probe.

RESULTS

The electron probe photographs clearly showed that the polytetrafluoroethylene resin applied by the method of the present invention (Example III-A) provided a homogeneous dispersion of resin particles throughout the vermicular expanded graphite. In marked contrast, the polytetrafluoroethylene resin applied by mechanically mixing powder (Comparative Run X) resulted in a non-homogeneous, localized polytetrafluoroethylene distribution in the graphite.

EXAMPLE IV

Lining a Substrate with Vermicular Expanded Composite Material

An excellent utility for the compressed vermicular expanded graphite composite material is to form it into a substantially smooth fluid impervious, internal lining for a metallic conduit.

PART (A)

A seven inch long spool piece of schedule 40 flanged steel pipe having a 2 inch inside diameter was lined with a vermicular expanded graphite composite material containing about 12 percent by weight of polytetrafluoroethylene. The composite material was produced substantially as described in Example I-A.

Two 50 g portions of the vermicular expanded graphite composite material were compressed in a cylindrical die of 4 inch inside diameter using about 250 pounds per square inch compression force to form a ring. This ring conformed to the interior surface of the spool piece and extended about one inch around the inside of each flanged portion of the pipe and about 1 inch into the cylindrical barrel portion of the pipe. The ring was compressed against the surface of the spool piece by the application of about 300 psig force.

Blind flanges, which were drilled and tapped to take tube to pipe fittings (for example, a ¼ tube to ⅜" male pipe Swagelok fitting), were bolted on each of the flanged portions of the spool piece after the composite end pieces described above were in place. A piece of 5/16 inch inside diameter 1/16 inch wall thickness amber rubber tubing was stretched about twice its length (100%) over a piece of ¼ inch metal tubing about 14 inches in length. The metal tubing was then positioned within the interior of the spool piece by passing the tubing through the fittings on each flange by means of plastic ferrules which were compressed onto the rubber tube. Small holes in the ¼ inch metal tubing allowed for water to expand the rubber tube concentrically inside of the 2 inch steel pipe.

Portions of the vermicular expanded graphite composite material were chopped in a Waring Blender for about 20–30 seconds, and then introduced into the interior of the 2 inch steel pipe by removing one of the end flanges. The vermicular expanded graphite composite material loosely fitted into the annular space between the rubber tube and the inner wall of the 2 inch steel pipe. The air was removed from this space by evacuation with a vacuum pump communicating with the space through a porous plug in one of the end flanges. The rubber tube was then expanded with water pressure to compress the composite material onto the 2 inch pipe wall using about 500 psig compression force. This procedure was repeated until the thickness of the composite material on the wall of the 2 inch pipe was about 0.2 inch.

The blind end flanges were then removed and the spool piece was placed in a rubber bag which conformed to the interior contours of the spool piece. The air was removed from the bag with a vacuum pump and the bag was sealed off. The spool piece was then placed in an isostatic pressure vessel (such as Autoclave Model IP 12-36-30) and the pressure was increased to about 25,000 psig. This pressure was maintained for about 60 seconds, and then the spool piece was removed. Examination of the lining indicated that the composite material had been compressed into a substantially monolithic layer on the interior surface of the spool piece.

PART (B)

A seven inch long spool piece of schedule 40 flanged steel pipe having a 2 inch inside diameter was fitted with the composite end pieces described in Part (A).

In place of the straight rubber tubing used in Part (A), a "finger" type rubber tubing was employed. This tubing had a ½ inch inside diameter and a ¾ inch outside diameter and was supported on a ⅜ inch mandrel which passed upward through an aperture in the bottom flange and extended through the center of the spool piece substantially the entire length of the spool piece. The top portion of the tubing was sealed shut with rubber cement. The top portion of the spool piece was then connected via an aperture in the flange, to the opening in a 2 inch ball valve (Jamesbury Brass, 2 inch ball valve). This valve was opened, filled with the vermicular expanded graphite composite material and closed. The air was removed from the annular space between the rubber finger tube and the inner wall of the 2 inch steel pipe by pulling a vacuum through the ball valve. The "finger" tube was then expanded by introducing water into the tube. The expanding tube compressed the loose vermicular expanded graphite composite material onto the pipe walls at a pressure of from about 100 to about 500 psig. This procedure was repeated until the thickness of the composite material on the wall of the 2 inch pipe was about 0.2 inch.

The spool piece was isostatically compressed as described in Part A.

The use of ball valve and "finger" tube was found to greatly facilitate the multiple loadings needed to build up the desired graphite composite wall thickness.

PART (C)

In another embodiment of the basic lining procedure described in Part (A), the preformed compressed graphite composite end pieces were not employed. Instead the internal rubber tubing was shaped to conform not only to the cylindrical barrel portion of the spool piece, but also to the outwardly extending flanged portions. A metal ring spacer was then placed between the flanged portions of the spool piece and the flanged end pieces. The loose vermicular expanded graphite composite material was introduced into the annular space between the pipe wall and the tubing by unbolting one of the flanged end pieces. The composite material was compressed as described in Part (A).

This embodiment has the advantage of producing the lining in one continuous piece, rather than by the two piece method used in both Parts (A) and (B).

EXAMPLE V

Several samples of the 7 inch long, 2 inch inside diameter spool pieces lined with the composite material by the methods described in Examples IV-A or IV-B were subjected to a variety of corrosive fluids to determine permeability. Table I summarizes the results of these tests. The tests were considered failures if the corrosive material penetrated a portion of the lining and attacked the metal substrate.

It is readily seen that the vermicular expanded graphite composite materials of the present invention is surprisingly quite impervious to a variety of corrosive fluids. The one reported failure is attributed to the presence of excessive amounts of bromine, which is well known in the art to attack graphite.

TABLE I

| Corrosive Material | Time (Months) | Failure |
|---|---|---|
| 20% HCl solution @ 80° C. | 4 | No |
| Mixture of chlorinated benzene and HCl | 9.5 | No |
| 32% HCl, 1000 ppm Cl$_2$ | 6 | No |
| 2% Acetic Acid @ 20–50° C. | | |
| 80° C. molten monochloroacetic acid | 7.5 | No |
| Chloroacetic acid | 6 | No |
| 150 lb steam @ 358° F. | 2 | No |
| 60% H$_2$SO$_4$ @ 90°–120° C., S, Br | 2 | Yes |
| 22% brine, 10–100 ppm Cl$_2$, pH 4–8, 100° C. | 4.5 | No |
| Hot HCl gas | 4 | No |
| 127 ft/sec steam @ 100° C. | 1 week | No |
| Chloromethyl methyl ether 50° C. | 2 | No |

What is claimed is:

1. In a method of preparing compressed forms of expanded graphite including the steps of
   (a) providing a supply of vermicular expanded graphite;
   (b) providing a supply of a corrosion resistant resin;
   (c) blending said vermicular expanded graphite and corrosion resistant resin in an amount of from about 3 to about 50 weight percent resin based on the total weight of the vermicular expanded graphite-resin mixture;
   (d) compressing said mixture at a pressure within the range of from about 5 to about 50,000 pounds per square inch in predetermined directions into predetermined forms of graphite;
   the improvement comprising:
   (1) blending said vermicular expanded graphite with said corrosion resistant resin in the form of a dispersion of said resin in a volatile liquid carrier;
   (2) vaporizing said liquid carrier; and
   (3) heating said composite material to a sufficient temperature to sinter said resin prior to compression.

2. The method of claim 1 wherein the corrosion resistant resin is thermally stable at a temperature of at least about 300° F.

3. The method of claim 1 wherein the corrosion resistant resin is selected from the group consisting of polytrifluorochloroethylene, polytrifluoroethylene, fluorinated ethylene propylene copolymer, perfluoroalkoxy resins, polyethylene, acrylic and methacrylic polymers, polystyrene, epoxy resins, polyvinyl chloride, polyesters, polycarbonate resins, phenol formaldehydes, nylon, polyvinylidenefluoride, and copolymers of the same.

4. The method of claim 1 wherein the corrosion resistant resin is selected from the group consisting of polytetrafluoroethylene, polytrifluorochloroethylene, fluorinated ethylene propylene copolymer, and perfluoroalkoxy resins.

5. The method of claim 1 wherein the corrosion resistant resin is polytetrafluoroethylene.

6. The method of claim 5 wherein the composite material is heated to a temperature of from 680° F. to about 700° F. to sinter the polytetrafluoroethylene.

7. The method of claim 1 wherein the vermicular expanded graphite is blended with the corrosion resistant resin in an amount of from about 5 to about 25 weight percent resin.

8. The method of claim 1, wherein the vermicular expanded graphite is blended with the corrosion resistant resin in an amount of from about 10 to about 15 weight percent resin.

9. The method of claim 1 wherein the volatile liquid carrier is water.

10. The method of claim 1 wherein the dispersion of resin particles contains from about 1 to about 5 percent by weight solids.

11. An article comprising a substrate having at least one surface thereof coated with a compressed vermicular expanded graphite composite material prepared in accordance with the method of claim 1.

12. The article of claim 11 wherein the substrate is a conduit.

13. The article of claim 12 wherein the conduit is metallic.

14. The article of claim 12 wherein the conduit is coated with from about 0.05 to about 0.10 inch of said compressed vermicular expanded graphite composite material.

* * * * *

UNITED STATES PATENT AND TRADEMARK OFFICE
CERTIFICATE OF CORRECTION

PATENT NO. : 4,199,628
DATED : April 22, 1980
INVENTOR(S) : Ronald S. Caines

It is certified that error appears in the above-identified patent and that said Letters Patent are hereby corrected as shown below:

Col. 3, line 24, delete the word "temperature" and insert --temperatures--.

Col. 4, line 59, insert the word --graphite-- after the word "expanded".

Col. 4, line 68, insert the word --about-- before the numeral "30".

Col. 5, line 22, delete the word "liquid" and insert the word --lined--.

Col. 6, line 22, delete "so-called acidified" and insert --so-acidified--.

Col. 10, line 50, Claim 3, delete the word "trifluorochloroethylene" and insert --polytetrafluoroethylene--

Col. 10, line 50, Claim 3, delete the word "polytrifluoroethylene" and insert --polytrifluorochloro-ethylene--.

Signed and Sealed this

Fifth Day of August 1980

[SEAL]

Attest:

SIDNEY A. DIAMOND

Attesting Officer

Commissioner of Patents and Trademarks